United States Patent
Anderson

[15] 3,707,000
[45] Dec. 19, 1972

[54] HYDROLOGICAL RECORDER

[72] Inventor: James Mitchell Anderson, Salisbury, Rhodesia

[73] Assignee: Philip Van Heerden, in his capacity of Minister of Water Development for the Government of Rhodesia, 'Peridot', Rusake, Rhodesia

[22] Filed: June 5, 1970

[21] Appl. No.: 43,714

[52] U.S. Cl. ............... 346/33 TP, 73/304 R, 73/391, 73/401
[51] Int. Cl. ............................................. G01l 19/08
[58] Field of Search .346/33 R, 33 TP, 72; 73/170 A, 73/302, 304 R, 312, 391, 398 R, 401

[56] References Cited

UNITED STATES PATENTS

| | | | |
|---|---|---|---|
| 1,881,572 | 10/1932 | Herz | 73/401 UX |
| 2,657,577 | 11/1953 | Falk | 73/312 X |
| 3,427,632 | 2/1969 | Vahs et al. | 73/312 X |

*Primary Examiner*—Joseph W. Hartary
*Attorney*—Herbert L. Boettcher, S. Delvalle Goldsmith, Aaron M. Scharf, Lester Horwitz, Iain Baillie and Robert Black

[57] ABSTRACT

Data processing and recording apparatus for use in receiving and recording hydrological information. There is provided a sensor means and a punching system to perforate paper tape at predeterminable time intervals in accordance with stimuli received from the sensor means. The sensor means has a pressure sensitive device located where hydrological information is sought. A detector translates pressure changes in the pressure sensitive device into electrical impulses to operate the punching system. The pressure sensitive device has an open ended tube through which a gas is forced from a supply vessel. The gas pressure is increased until gas bubbles pass from the open end of the tube at a predeterminable rate and a well-type mercury manometer is connected to the pressure sensitive device in an air-tight manner.

1 Claim, 6 Drawing Figures

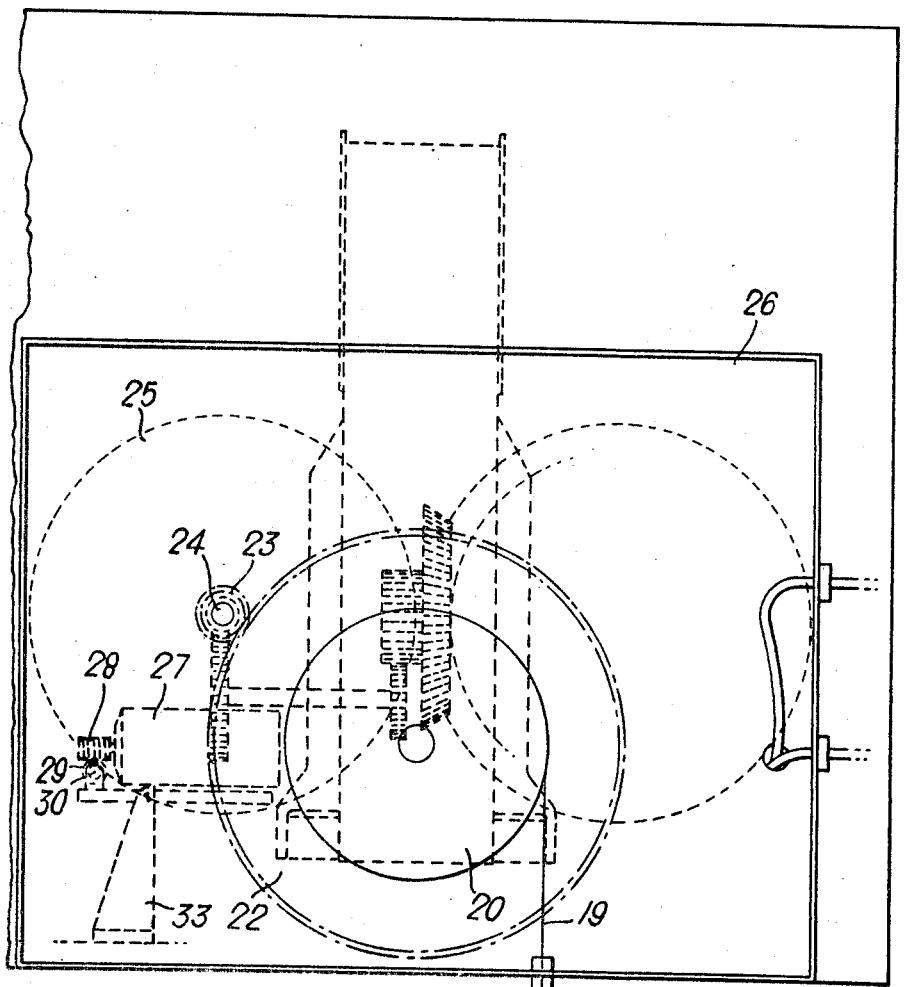
Fig. 2.
Fig. 1.
Inventor,
JAMES MITCHELL ANDERSON
By,
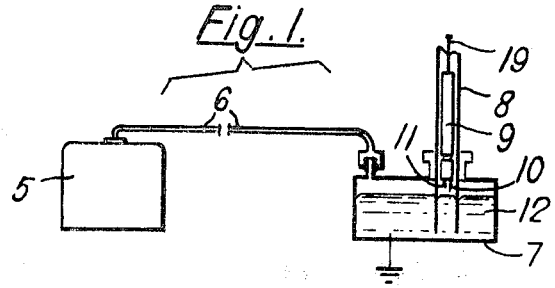 Attorneys JAMES MITCHELL ANDERSON,
Inventor By
Wenderoth, Lind & Ponack Attorneys

HYDROLOGICAL RECORDER

This invention relates to data processing and recording apparatus and particularly although not exclusively, is concerned with providing improved means for recording changes in pressure such as are caused by changes in water levels.

An instrument adapted for this purpose comprises an electrically wound clockwork mechanism which actuates a punching device at predeterminable time intervals. The punching device comprises a pair of discs adapted to be rotated in accordance with stimuli received and, by means of suitable formations on a face of the disc, to line up one or more tines or punches with a paper tape to be perforated. At the selected predetermined time interval, a platen brings the selected punches into contact with the tape thus perforating it for record purposes. The platen then returns to neutral position until the next time interval has elapsed when the punching cycle again takes place.

A vital part of the operation is the rotation of the discs to the required positions under the influence of applied stimuli so as to select the correct punch required to make a record on the tape. It is with this function that the invention is concerned and it is an object of the invention to provide relatively simple and foolproof apparatus which will achieve a reasonable degree of accuracy over long periods with the minimum of maintenance. Further objects of the invention will emerge from the description which follows.

According to the invention data processing and recording apparatus adapted for use in receiving and recording hydrological information includes a punching system adapted to perforate paper tape at predeterminable time intervals in accordance with stimuli received from at least one sensor means associated with the apparatus; the sensor means including a pressure sensitive device disposable in an environment where hydrological information is sought and a detector adapted to translate pressure changes in the pressure sensitive device into electrical impulses adapted to create mechanical movement of the punching system.

Further according to the invention data processing and recording apparatus is provided wherein the pressure sensitive device comprises an open ended tube through which a gas is forced from a supply vessel, the gas pressure being increased until gas bubbles pass from the open end of the tube at a predeterminable rate; the device being further linked in air-tight manner to a well-type mercury manometer.

Still further according to the invention data processing and recording apparatus is provided wherein the detector includes a probe having two electrodes of differing length so as to afford three possible states relative to the surface of the mercury in the manometer; a first state wherein both electrodes are free from the surface of the mercury; a second state wherein the longer electrode touches the surface of the mercury and a third state where both electrodes are in contact with the mercury; in each case to alter the balance of the electrical circuit associated with the apparatus whereby through mechanical means to raise or lower the probe to match the rise or fall of the surface of the mercury under variations of pressure in the pressure sensitive device and thereby to align a punch or punches in the punching system.

In order to illustrate the nature of the invention and how it may best be put into effect an example will be described in detail with reference to the accompanying drawings in which:

FIG. 1 illustrates the pressure sensitive device and associated manometer with its probe;

FIG. 2 illustrates a part schematic end elevation of a recorder;

Figure 5:
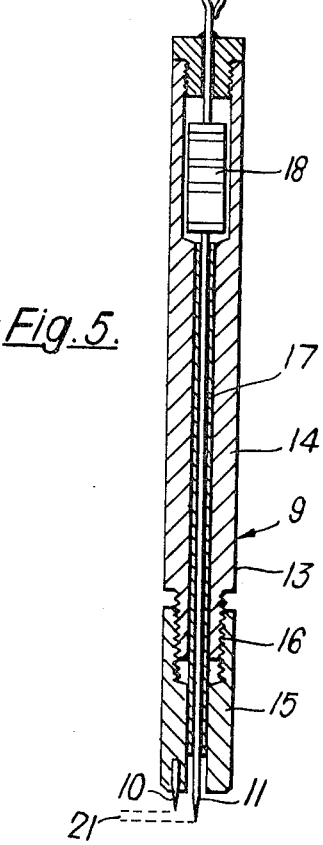

FIG. 5 a part sectioned view of a probe and

Figure 6:
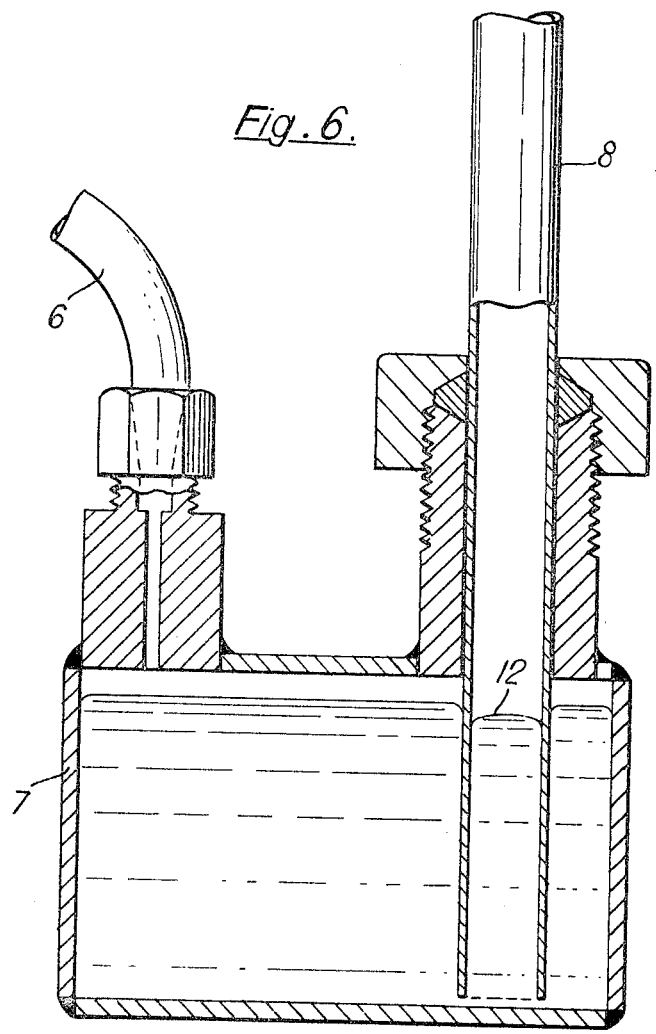

FIG. 6 a part sectioned view of a manometer.

Referring to FIG. 1, numeral 5 indicates a pressure sensitive vessel coupled by means of a small bore copper tube 6 to a well-type mercury manometer 7. Glass tubing 8 houses a probe 9 having two needle pointed nickel coated steel electrodes 10 and 11 adapted to make contact with the surface 12 of the mercury in manometer 7.

Probe 9 comprises a metal casing 13 (FIG. 5) divided into an upper portion 14 and a lower portion 15 coupled by threaded section 16 and having an insulated core 17 through which passes electrode 11. Electrode 10 is mechanically and electrically coupled to lower portion 15 of casing 13.

Figure 3:
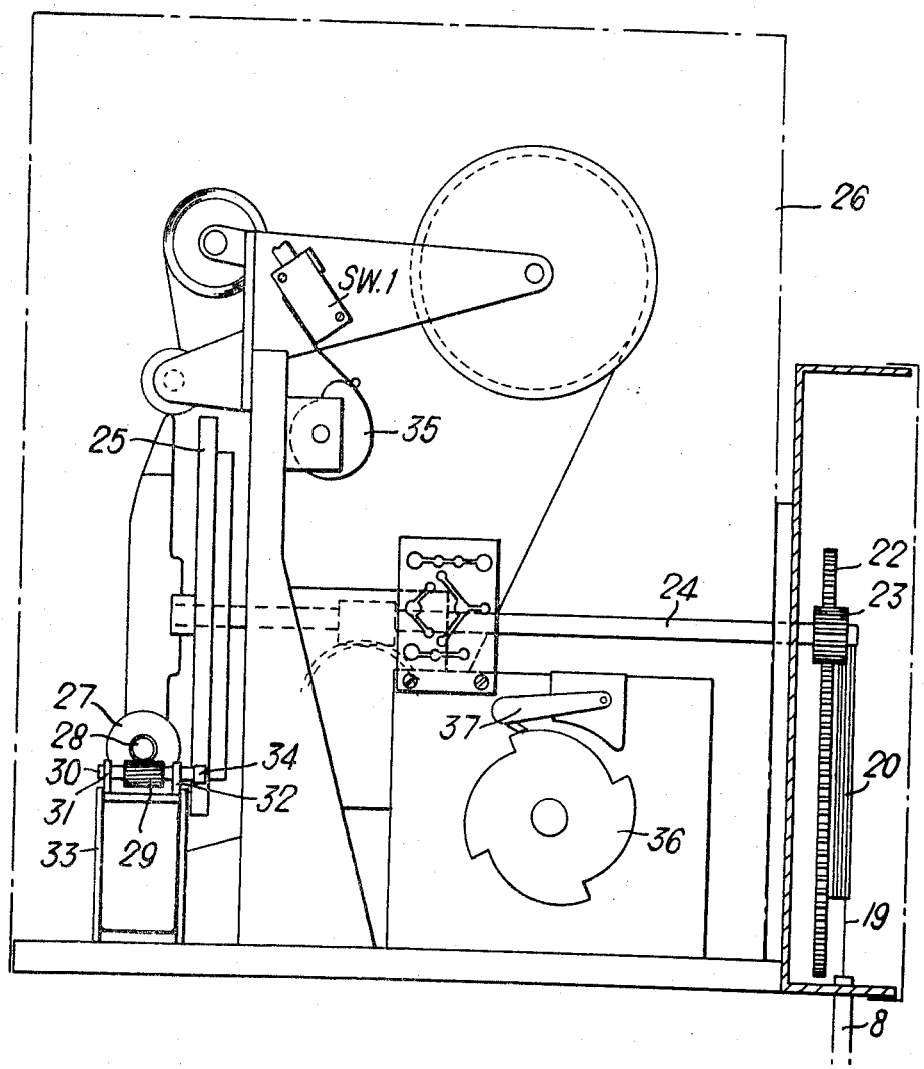
FIG. 3 illustrates a part sectioned schematic side elevation of a recorder.

An electrical resistor 18 having a value of 56 kilo ohm is housed in upper section 14 of casing 13 and is electrically coupled to electrode 11 and to electric current conducting cable 19 which is adapted to coil around cable drum 20, the coils lying in side-by-side relationship on the cable drum 20, as shown in FIG. 3.

Electrodes 10 and 11 are spaced apart any suitable distance to ensure effective electrical insulation from each other but the length of electrode 10 relative to electrode 11 may be adjusted by rotation of the lower portion 15 of casing 13 upon screwthreaded section 16 so as to create a vertically disposed gap 21 between the tip of the electrodes 10 and 11.

Drum 20 is mechanically coupled by gear 22 and gear 23 which is carried fixedly on shaft 24 which, in turn, is fixed to tape punching drum 25 of a recorder 26.

Reversible direct current electrical motor 27 (FIGS. 2 and 3) drives worm gear 28 which mates with spur gear 29 fixedly carried on shaft 30, resting in bearings 31 and 32, supported in housing 33. Shaft 30 further carries friction wheel 34 which is in rubbing contact with and adapted to drive tape punching drum 25, thereby rotating shaft 24 and, through gear train 22/23, cable drum 20 so raising or lowering probe 9 suspended at the end of cable 19.

Figure 4:
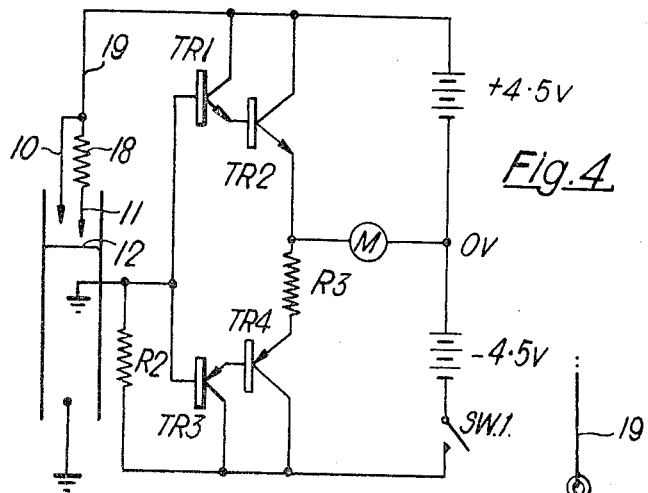
FIG. 4 illustrates a circuit diagram.

Referring to FIG. 4, numeral 10 indicates the electrode fixed to lower portion 15 of casing 13 of probe 9, and 11 is the electrode coupled to resistor 18 in the upper portion 14 of casing 13. Numeral 19 denotes the electric current conducting cable which joins probe 9 to the circuitry of recorder 26. The circuitry includes 4 transistors designated Tr 1, Tr 2, Tr 3 and Tr 4; Tr 1 being a 10 m.a. silicon transistor, Tr 2 a 120 m.a. silicon transistor, Tr 3 a 10 m.a. germamium transistor and Tr 4 a 120 m.a. germamium transistor. R2 is a 56 kilo ohm resistor connected at one side to the mercury and to the base electrodes of transistors Tr1 and Tr3 and at the other side to the collector electrodes of transistors Tr3 and Tr4, whilst R3 is a 74 ohm resistor connected between the emitter electrodes of transistors Tr4 and Tr2. R3 may be eliminated from the circuit where the gap 21 exceeds about 8 thousandths of an inch. The letter M denotes the direct current reversible electric motor 27 shown in FIGS. 2 and 3, the motor being connected between the emitter electrode of transistor Tr2 and a 0 volt point on a conductor connecting the cathode of one 4.5 volt battery (hereinafter called the plus 4.5 volt battery) with the anode of another 4.5 volt battery (hereinafter called the minus 4.5 volt battery). The motor has a starting current of 80 m.a. and a running current requirement of 25 m.a. at 4.5 volt. SW1 denotes a micro switch adapted to be operated by a cam 35 (FIG. 3) when the apparatus is due to make a recording.

In operation recorder 26 is housed in a suitable shelter on a river bank and is anchored to a position wherein probe 9 suspended on cable 19 passes down glass tube 8 to make contact with the surface 12 of mercury in manometer 7. Manometer 7 is joined by means of a length of small bore copper tube 6 to a pressure sensitive device 5 which is securely anchored to a datum point in the river bed.

The clockwork mechanism of the recorder is then set in motion and maintained in the wound condition by a suitable battery. By means of a cam 36 attached to an electric clock, switch 37 starts the recording process resulting in the tapes being punched in the code representing water level. During this process cam 35 rotates to bring SW1 to the 'on' position thereby switching the circuitry (FIG. 4) 'on'. During the 'off' periods the probe 9 will keep itself clear of any rise in the surface 12 of the mercury because a positive voltage will appear on the base of Tr 1 from the plus 4.5 volt battery via resistor 18 or its bypass electrode 10 and this will wind the probe 9 clear of the mercury surface 12.

Once clear of the surface 12, the circuit will draw no currents since Tr 1 and Tr 2 are silicon transistors. It may be mentioned that Tr 1 and Tr 3 may be omitted from the circuitry when very little oxidation is to be expected on the surface 12 of the mercury. If Tr 1 and Tr 3 are omitted the resistor 18 and R2 may each have a value of 2.2 kilo ohms.

When recorder 26 comes to the 'on' position a suitable time lapse interval is initiated during which the circuit comes to the rest position before punching takes place. Simultaneously SW1 will close under the influence of cam 35 and probe 9 will then move from a first state where the mercury will be below both probe points to a second state where probe 11 touches surface 12 of the mercury in manometer 7. In the first state, a negative voltage appears on the bases of Tr 1 and Tr 3 from the minus 4.5 volt battery via R2. This voltage keeps Tr 1 switched off but allows Tr 3 to conduct thereby switching Tr 4 'on'. The reversible direct current motor M will run in a direction suitable to rotate drum 20 so as to lower probe 9 until electrode 11 touches the surface 12 of the mercury in manometer 7. At this point the detector reaches the second state where resistor 18 and R2, being a matched pair of 56 kilo ohms resistors, will bring the voltage on the Tr 1 and Tr 3 bases to zero and therefore the circuit will rest. It is after this point in time that the recorder will punch the tape so recording the height of the mercury in manometer 7 relative to a datum line based on the level of the pressure sensitive device.

Should the mercury surface 12 rise it will contact electrode 10 thus bypassing resistor 18. The voltage on the bases of Tr 1 and Tr 3 will therefore become positive from the plus 4.5 volt battery thereby keeping Tr 3 switched 'off' but allowing Tr 1 to conduct and so to switch 'on' Tr 2. This will activate motor M to run in the reverse direction to the first state and consequently to lift the probe 9 until the electrode 10 clears surface 12 of the mercury in manometer 7 when the circuitry will again come to the state of rest. R3 is introduced into the circuit to act as a damper to slow down the movement of the probe 9 in its downward direction and thereby to minimize overriding of the 'rest' position when the gap 21 is set to very fine limits.

I claim:

1. Data processing and recording apparatus, for use in receiving and recording hydrological information, comprising:
    a. a sensor means comprising a pressure sensitive device to be located where hydrological information is sought, said device including an open ended tube through which a gas is forced from a supply vessel, the gas pressure being increased until gas bubbles pass from the open end of the tube at a predeterminable rate, and a well-type mercury manometer connected to said device in an air-tight manner;
    b. a punching system to perforate paper tape at predeterminable time intervals in accordance with stimuli received from said sensor means; and
    c. a detector to translate pressure changes in said pressure sensitive device into electrical impulses to operate said punching system, said detector comprising a probe having two electrodes of differing length to provide three possible states relative to the surface of the mercury in said manometer, said three possible states being a first state wherein both electrodes are free from the surface of the mercury, a second state wherein the longer electrode touches the surface of the mercury and a third state wherein both electrodes are in contact with the mercury, said three states each altering the balance of an electrical circuit having its input connected across the mercury and electrodes and its output connected across electromechanical means which raise or lower said probe to match the rise or fall of the surface of the mercury under variations of pressure in said pressure sensitive device to align a punch in said punching system.

* * * * *